(12) United States Patent
Alten

(10) Patent No.: US 7,437,553 B2
(45) Date of Patent: Oct. 14, 2008

(54) SYSTEMS AND METHODS FOR PROVIDING AUTONOMOUS SECURITY

(76) Inventor: Alex I. Alten, 9229 Klementson Dr., Pleasanton, CA (US) 94588

( * ) Notice: Subject to any disclaimer, the term of this patent is extended or adjusted under 35 U.S.C. 154(b) by 775 days.

(21) Appl. No.: 10/687,216

(22) Filed: Oct. 15, 2003

(65) Prior Publication Data

US 2004/0103279 A1    May 27, 2004

Related U.S. Application Data

(60) Provisional application No. 60/418,802, filed on Oct. 15, 2002.

(51) Int. Cl.
| H04L 9/00 | (2006.01) |
| G06F 9/00 | (2006.01) |
| G06F 15/16 | (2006.01) |
| G06F 17/00 | (2006.01) |
| G06F 7/04 | (2006.01) |
| G06F 7/58 | (2006.01) |
| G06F 11/30 | (2006.01) |

(52) U.S. Cl. ............... 713/160; 713/151; 713/161; 713/162; 726/15; 380/279
(58) Field of Classification Search ............ 380/279; 726/15; 713/160, 161, 162
See application file for complete search history.

(56) References Cited

U.S. PATENT DOCUMENTS

| 2001/0047487 | A1* | 11/2001 | Linnakangas et al. | ........ | 713/201 |
| 2002/0147820 | A1* | 10/2002 | Yokote | ........ | 709/229 |
| 2003/0093694 | A1* | 5/2003 | Medvinsky et al. | ......... | 713/201 |

* cited by examiner

*Primary Examiner*—Ayaz Sheikh
*Assistant Examiner*—Shin-Hon Chen
(74) *Attorney, Agent, or Firm*—JW Law Group PC; James M. Wu

(57) ABSTRACT

Systems and methods for providing autonomous security are configured to modify an original header associated with an original data packet wherein key information is added; encrypt original data associated with the original data packet in response to the key information; and form an encrypted data packet including the modified header and the encrypted data, wherein the encrypted data packet is a same size as the original data packet.

15 Claims, 16 Drawing Sheets

Fig. 3  Key or Seed Data Structure
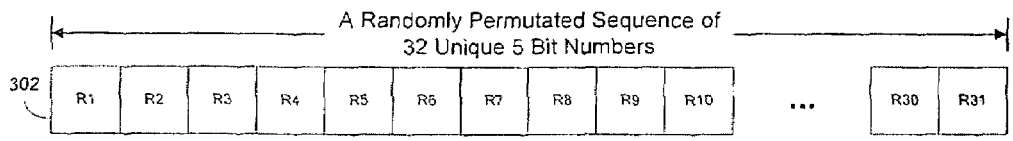
Fig. 4  Unit Sizes Used For Partitioning Random Permutations
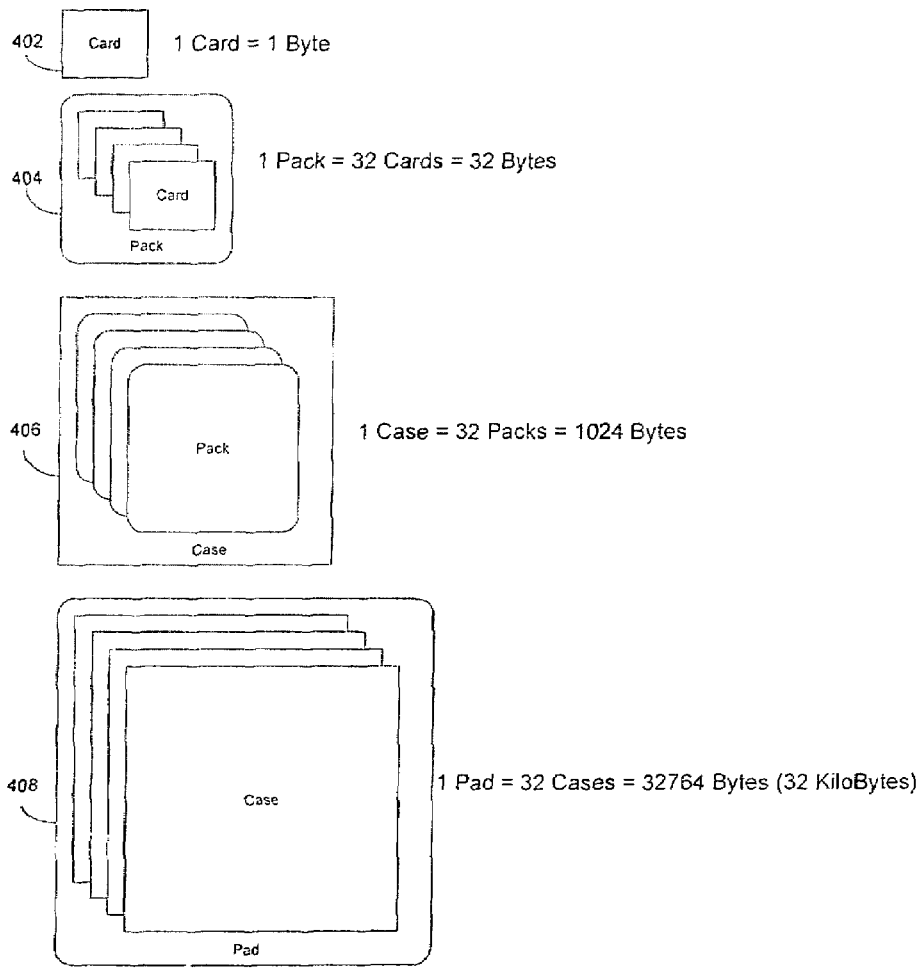

Fig. 8    Flow Chart for Nested Shuffle

Fig. 9  Nested Shuffle of a Series of Cards

Ratio 1 = 8 bits
Ratio 2 = 8 bits
Offset = 9 bits

Fig. 18 Nested Shuffle Of A Source Pad (32 KB)

SYSTEMS AND METHODS FOR PROVIDING AUTONOMOUS SECURITY

CROSS REFERENCE TO RELATED APPLICATIONS

The application claims priority from the U.S. provisional application entitled "Secure Autonomous System and Method for the Internet Protocol" filed on Oct. 15, 2002, with Ser. No. 60/418,802, which is herein incorporated by reference.

FIELD OF THE INVENTION

This invention relates to secure computer networking systems in general and in particular to securing autonomous systems that use the Internet Protocol.

BACKGROUND

Security systems and secure communication channels are well known for providing the underpinnings of providing trusted communications among individuals and organizations. Having secure communications between parties is desirable for financial transactions and confidential communications.

The emergence of the Internet Protocol version 4 (IPv4) as the universal datagram routing protocol has provided a common computer networking protocol that enables the world's computers to communicate with one another seamlessly without regard to geography. As the world's society has come to depend on IPv4 for commerce it has become increasingly evident that it needs to be secure, especially with the increased use of subnets using portions of the radio spectrum to transmit and receive network packets.

Traditionally, security systems and methods typically either encapsulate IPv4 within a lower layer security protocol or they use IPv4 to provide routing for a higher layer secure networking protocol.

It would be desirable to have a security system and methods to provide secure communications natively within a common routing protocol such as IPv4.

SUMMARY

Systems and methods for providing autonomous security are configured to modify an original header associated with an original data packet wherein key information is added; encrypt original data associated with the original data packet in response to the key information; and form an encrypted data packet including the modified header and the encrypted data, wherein the encrypted data packet is a same size as the original data packet.

BRIEF DESCRIPTION OF THE DRAWINGS

FIG. 3 depicts a diagram illustrating the Key or Seed Data Structure according to the invention.

FIG. 4 depicts a diagram illustrating unit sizes according to the invention.

DETAILED DESCRIPTION

Specific reference is made in detail to the embodiments of the invention, examples of which are illustrated in the accompanying drawings and following descriptions. While the invention is described in conjunction with the embodiments, it will be understood that the embodiments are not intended to limit the scope of the invention. The various embodiments are intended to illustrate the invention in different applications. Further, specific details are set forth in the embodiments for exemplary purposes and are not intended to limit the scope of the invention. In other instances, well-known methods, procedures, and components have not been described in detail as not to unnecessarily obscure aspects of the invention.

In the following descriptions, the following descriptive names will be used: Key, Seed, Vector, Pad, Value, Card, Pack, Case, Initialization Vector (IV), random number generator (RNG), and pseudo random number generator (PRNG). A Key, Pad, and Value are populated with random bits from the PRNG. A random factorial permutation of a sequence of bytes or numbers will be referred to as a Shuffle. An AES Key or an AES IV is a single 16 byte random value. In the following descriptions, the following acronyms for the Internet Protocol version 4 (Internet Standard RFC 791) will be used: IP and IPv4.

Figure 1:
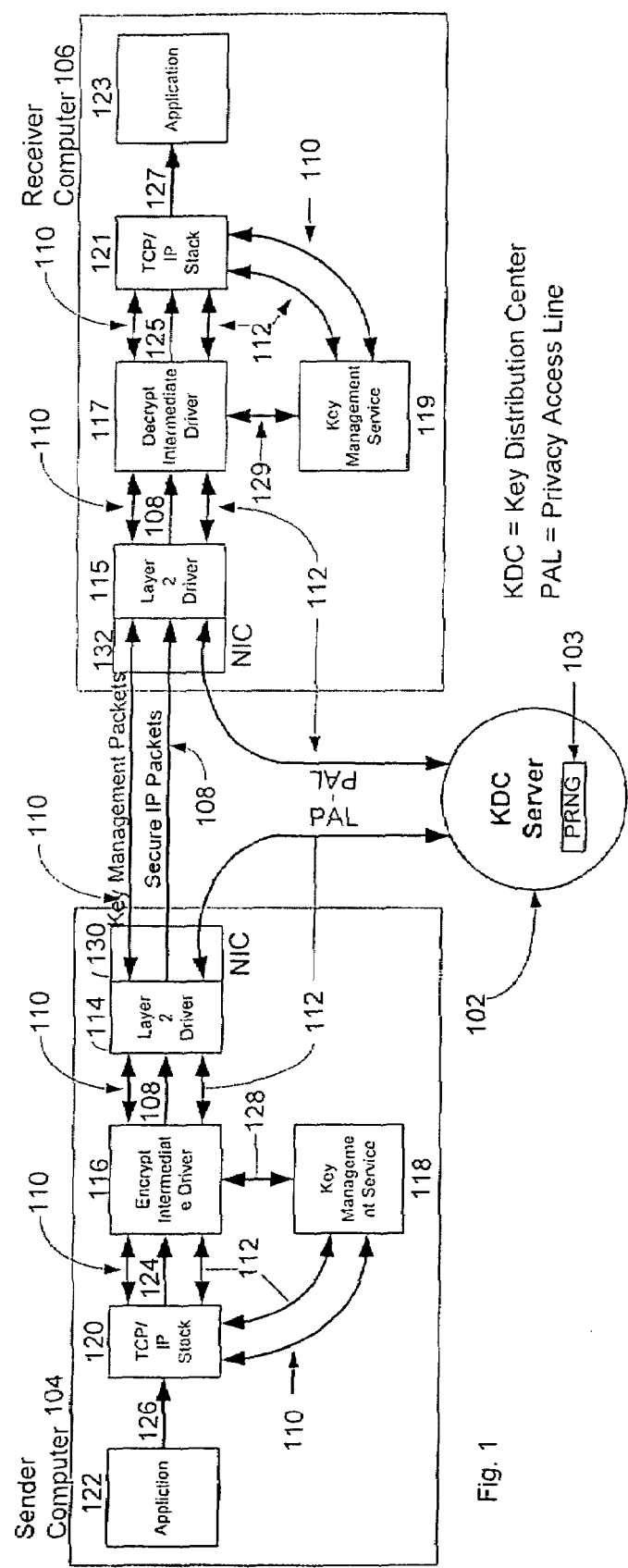
FIG. 1 depicts a diagram illustrating a data flow between a sender, a receiver and server according to the invention.

Referring to FIG. 1, a system (100) illustrates a secure autonomous system for providing secure communications through the Internet Protocol. The system (100) consists of several interoperating software components and secured computer networking protocols.

In some embodiments, there is a central Key and Pad Server (102), also known as a Key Distribution Center (KDC), that supplies all the cryptographic materials necessary used by two communicating computers, a sender computer (104) and a receiver computer (106), that are sending and receiving secure IP packets (108). In some embodiments, the sender computer (104) and the receiver computer (106) communicate via network such as the Internet.

In some embodiments, the sender computer (104) and the receiver computer (106) maintain key synchronization with separate Key Management (KM) computer networking packets (110). These KM packets are configured to utilize either IP or UDP packets as transport. In some instances, both the sender computer (104) and the receiver computer (106) request and receive cryptographic key and pad materials from the KDC (102) using a secure, mutually authenticated communications channel (112), called the Privacy Access Line (PAL).

In some embodiments, the sender computer (104) contains the following software components; a Layer-2 Driver (114) that communicates with the Network Interface Card (NIC) (130), an encryption intermediate driver (116), a Key Management (KM) Service (118), a TCP/IP protocol stack (120) and a sender application (122).

In some embodiments, the sender application (122) initiates sending clear data to the TCP/IP Stack (120). In this embodiment, the TCP/IP stack (120) formulates a standard IP packet and sends it to the encryption intermediate driver (116). This driver (116) communicates with the KM Service (118) to get any keys and IV's it needs to encrypt IP packet data payloads. In some embodiments, the KM Service (118) uses either UDP or IP packets to send and receive PAL (112) packets from the KDC Server (102). The Sender's KM Service (118) uses either UDP or IP packets to send KM Packets (110) to the Receiver's KM Service (119) to notify it that a series of encrypted IP packets will soon be sent to it and that it will need to get the appropriate encryption materials. Using a Key and an IV the encryption intermediate driver (116) sends an IP packet with an encrypted payload and a slightly modified header (with a recomputed check sum) to the Layer-2 Driver (114) that in turn makes the NIC (130) transmit the encrypted packet onto the communications channel connected to the NIC (132). The slightly modified header is shown in more detail in FIG. 10.

In some embodiments, the channel includes any standard IP subnet, like Ethernet, Wi-Fi, ATM, etc. In other embodiments, the sender computer (104) and receiver computer (106) can be on the same subnet or on different subnets separated by one or more IP routers.

In some embodiments, the receiver computer (106) then receives the IP packets with encrypted data payloads with the NIC (132). The Layer-2 Driver (115) then takes the IP packets from the NIC (132) and sends the IP packets to the decryption intermediate driver (117). This driver (117) communicates with it's corresponding KM Service (119) to get any keys and IV's it needs to decrypt IP packet payloads. The KM Service (119) uses either UDP or IP packets to send and receive PAL (112) packets from the KDC Server (102). In some embodiments, the receiver computer (106) sends acknowledgment packets to the Sender's KM Service (118) using KM Packets (110).

In some embodiments, IP packets with encrypted data payloads may arrive at the receiver computer (106) out of order and some payloads can be missing. In some embodiments, the incoming IP packets have their payloads decrypted and the IP packet with clear data payloads is sent to the TCP/IP Stack (121) that in turn transmits the data to the application (123) for processing.

Figure 2:
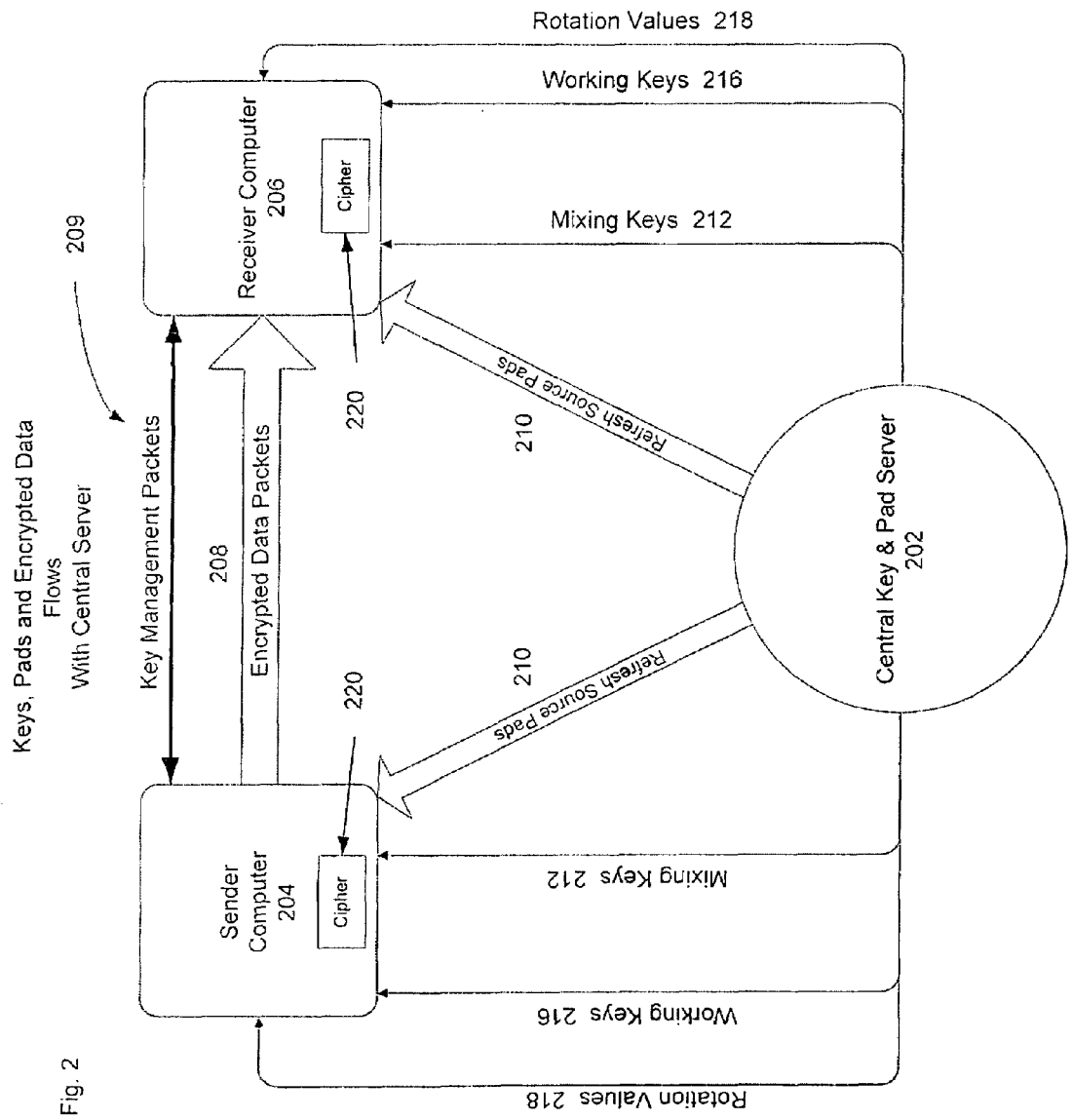
FIG. 2 depicts a diagram illustrating a data flow between a sender, a receiver and server according to the invention.

Referring to FIG. 2, the system 100 benefits from access to a reliable, moderately fast network for key and pad material distribution. In one embodiment, a 10 Mbps Ethernet LAN is utilized for back channel communications with a central Key and Pad Server (202), which contains a RNG and a PRNG. In one embodiment, the AES cipher itself will support over 100 Mbps encrypted throughput (208) on an ordinary computer's communication interface, typically either 100 Mbps or 1 Gbps Ethernet, between the two computers, a sender computer (204) and a receiver computer (206). In one embodiment, each of these computers shares the identical sets of working keys (216), rotation values (218), mixing keys (212), and source pads (210), a copy of the key and IV generation algorithm (220), and a copy of the AES cipher either in software or hardware. The source pads (210) are periodically refreshed on both computers to maintain the maximum level of security. To extend the life (i.e. keep them secret longer) of the source pads (210), while they are on both computers, the server will send out Mixing Keys (212) as needed. More frequently, Rotation Values (218) and Working Keys (216) are sent out to each machine to regenerate the actual randomly created pad used to derive AES keys and IV's that are used to encrypt the outgoing IP packet's clear data payload or decrypt the incoming IP packet's cipher data payload (208). Note that for purposes of this document all communications with the Key & Pad Server are considered secure, i.e. cryptographically mutually authenticated and private. This could also be achieved by having a separate physically secure 10 Mbps LAN dedicated to only distributing Keys, Values and Pads from the Server.

Referring to FIG. 3, the random control sequence of unique numbers are shown as a key (302). In one embodiment, the key (302) is generated from a PRNG. In some embodiments, the key (302) come in sequences 32 unique numbers randomly shuffled only from the range of values 0 to 31. In this embodiment, the number of active bits per number is 5.

Referring to FIG. 4, when large sequences of numbers are randomly shuffled, they are broken up into certain sizes in one embodiment. The smallest size is called a card (402). A card is 1 byte in size. The next larger size is a pack (404), which consists of 32 cards. The next larger size is a case (406), which consists of 32 packs. The largest size is the large sequence of numbers to be shuffled, called a pad (408), which consists of 32 cases.

Figure 5:
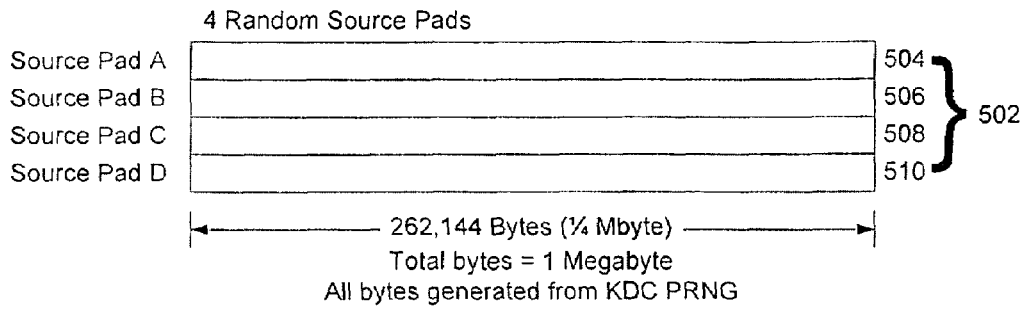
FIG. 5 depicts a diagram illustrating random Source Pads according to the invention.

Referring to FIG. 5, all keys and IV materials used to encrypt or decrypt IP packet data payloads are typically derived from four (4) random source pads (502). Each Source Pad (504, 506, 508, 510) consists of 262,144 random bytes that was generated by the PRNG on the KDC server. The total size is 1 Megabyte of random seed material.

Figure 6:
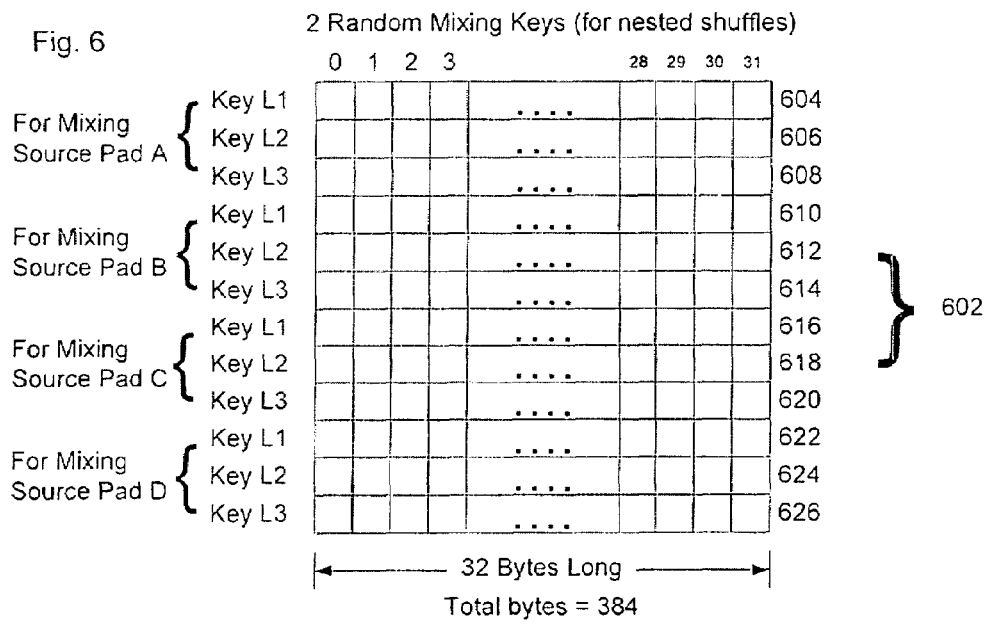
FIG. 6 depicts a diagram illustrating Mixing Keys according to the invention.

Referring to FIG. 6, the first stage of creating keys and IV materials used to encrypt or decrypt IP packet data payloads is controlled by mixing keys (602) from the KDC server. There are twelve (12) mixing keys (604, 606, 608, 610, 612, 614, 616, 618, 620, 622, 624, 626). Each mixing key consists of a randomly mixed set of unique numbers from 0 to 31, one per byte, a total of 32 bytes each. Mixing keys (604, 610, 616, 622) are used for Level 1 mixing (L1) of each Source Pad. Mixing keys (606, 612, 618, 624) are used for Level 2 mixing (L2) of each Source Pad. Mixing keys (608, 614, 620, 626) are used for Level 3 mixing (L3) of each source pad. The total size is 384 bytes.

Figure 7:
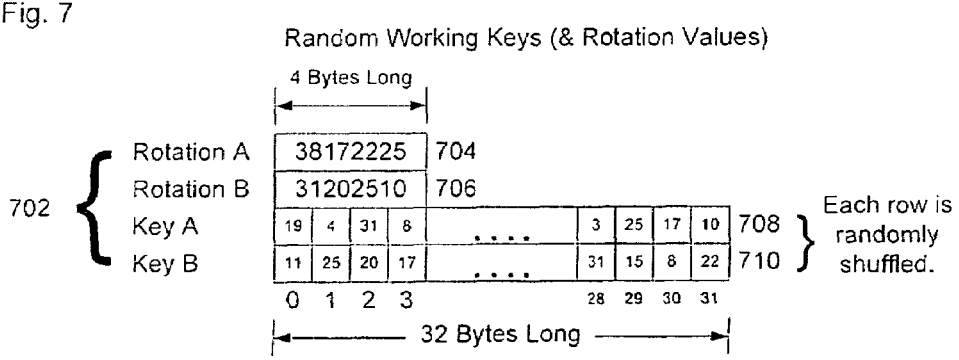
FIG. 7 depicts a diagram illustrating Working Keys according to the invention.

Referring to FIG. 7, the second stage of creating keys and IV materials used to encrypt or decrypt IP packet data payloads is controlled by a set of working keys and rotation values from the KDC server. The are two (2) rotation values (704, 706), 4 bytes each, and two (2) working keys, 32 bytes each. Each rotation value is a random number generated by the KDC's PRNG. Each working key consists of a randomly mixed set of unique numbers from 0 to 31, one per byte. These will all collectively be referred to as the working keys (702). Total size is 72 bytes. The keys and IV materials as described in FIGS. 5, 6, and 7 are utilized to illustrate a specific, particular embodiment. Other embodiments can be utilized without departing from the spirit of the invention.

Figure 8:
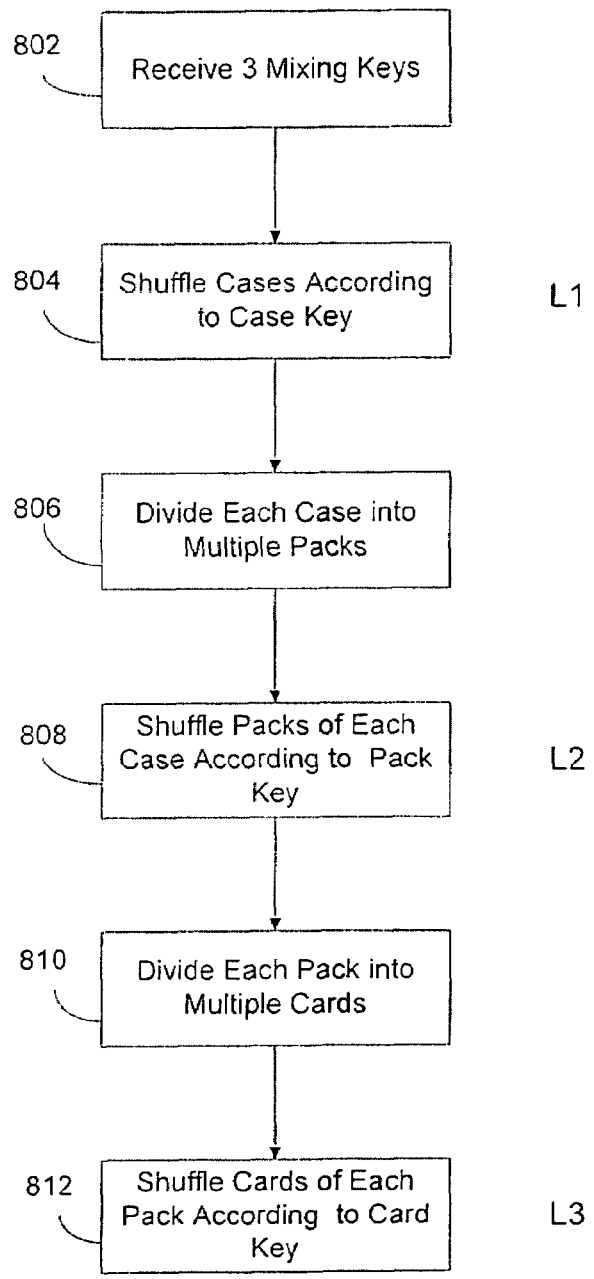
FIG. 8 depicts a flow diagram illustrating a process of random nested shuffling according the invention.

Referring to FIG. 8, a nested shuffling process is shown by the flow diagram. At block 802, the 3 mixing keys are received. The 3 mixing keys include case keys, pack keys, and card keys. At block 804, a shuffling function is performed on each case utilizing a case key for each case, this is a Level 1 shuffle (L1). At block 806, each of the shuffled cases are divided into multiple packs. At block 808, a shuffling function is performed on each pack utilizing a pack key for each pack, this is a Level 2 shuffle (L2). At block 810, each of the shuffled packs are divided into multiple cards. At block 812, a shuffling function is performed on each card utilizing a card key for each card, this is a Level 3 shuffle (L3).

Figure 9:
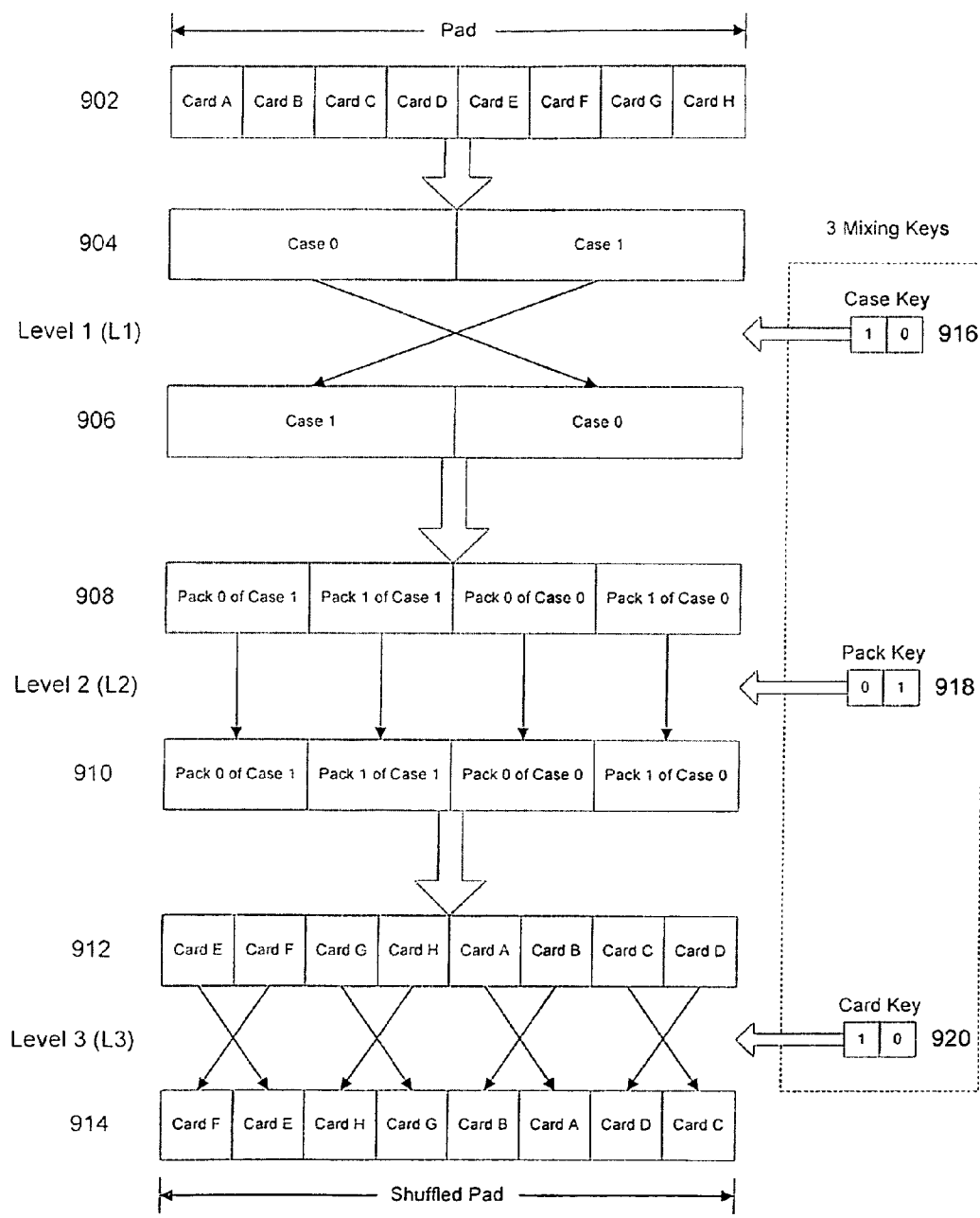
FIG. 9 depicts a diagram illustrating a random nested shuffle of a number sequence according to the invention.

Referring to FIG. 9, a nested shuffling of a sequence of cards proceeds as follows. A sequence of cards (902) divided into cases (904), which are then shuffled according to a case key (916), resulting in randomly permuted sequence of cases (906). A case key is also called a Level 1 Key (L1). Then in turn, these shuffled cases (906) are subdivided into packs (908), each case being partitioned identically, which are then shuffled according to a pack key (918) that is applied once per case to each set of packs contained therein, resulting in identically randomly permuted sequence of packs per case (910). A pack key is also called a Level 2 Key (L2). Then in turn, these shuffled packs (910) are subdivided into cards (912), each pack being partitioned identically, which are then shuffled according to a card key (920) that is applied once per pack to each set of cases contained therein, resulting in identically randomly permuted sequence of cards per pack (914). A card key is also called a Level 3 Key (L3).

Figure 10:
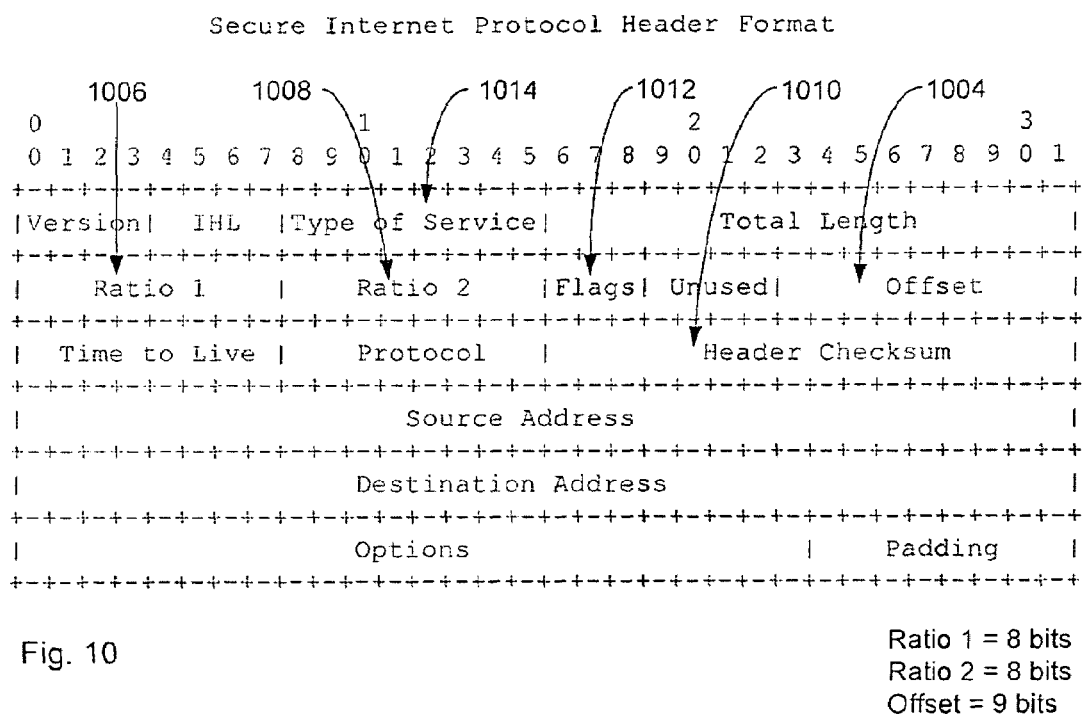
FIG. 10 depicts a diagram illustrating an Internet Protocol packet header with modified fields according to the invention.

FIG. 10 reveals a standard IP packet header that has been modified (1002) to support the encryption of the IP packet data payload that follows it. Two fields of the IP header, the fragment identification and the fragment offset have been replaced by three fields, the mixing key refresh ratio value or ration 1 (1006), the working key refresh ratio value or ration 2 (1008) and the offset for selecting key and IV values (1004) from a final pad. Optionally, the first bit of the standard flags field (1012) is set to 1 to indicate an encrypted IP packet, or the last bit of the type of service field (1014) may be set to 1 to indicate an encrypted IP packet. In some embodiments, these bits are unused by Internet standards. These bits are not required to be set for successful encryption and subsequent decryption of the IP data payload. After all the fields have been written, the header checksum field (1010) will need to be recomputed before the IP packet with encrypted data payload is transmitted. The flow diagram as depicted in FIG. 6 is merely one embodiment of the invention.

In use, the modified header (1002) allows an unencrypted data packet to be encrypted without changing the overall size of the encrypted data packet compared with the unencrypted data packet. By replacing the fragmentation identification and the fragment offset with the ration 1 value, the ration 2 value, and the IV values, the overall size of the data packet remains the same.

The flow diagrams in FIGS. 11, 12, and 15-20, illustrate one particular use of the invention based on a specific application. In other embodiments, the invention may be utilized with other applications. The blocks within the flow diagrams can be performed in a different sequence without departing from the spirit of the invention. Further, blocks can be deleted, added, or combined without departing from the spirit of the invention.

Figure 11:
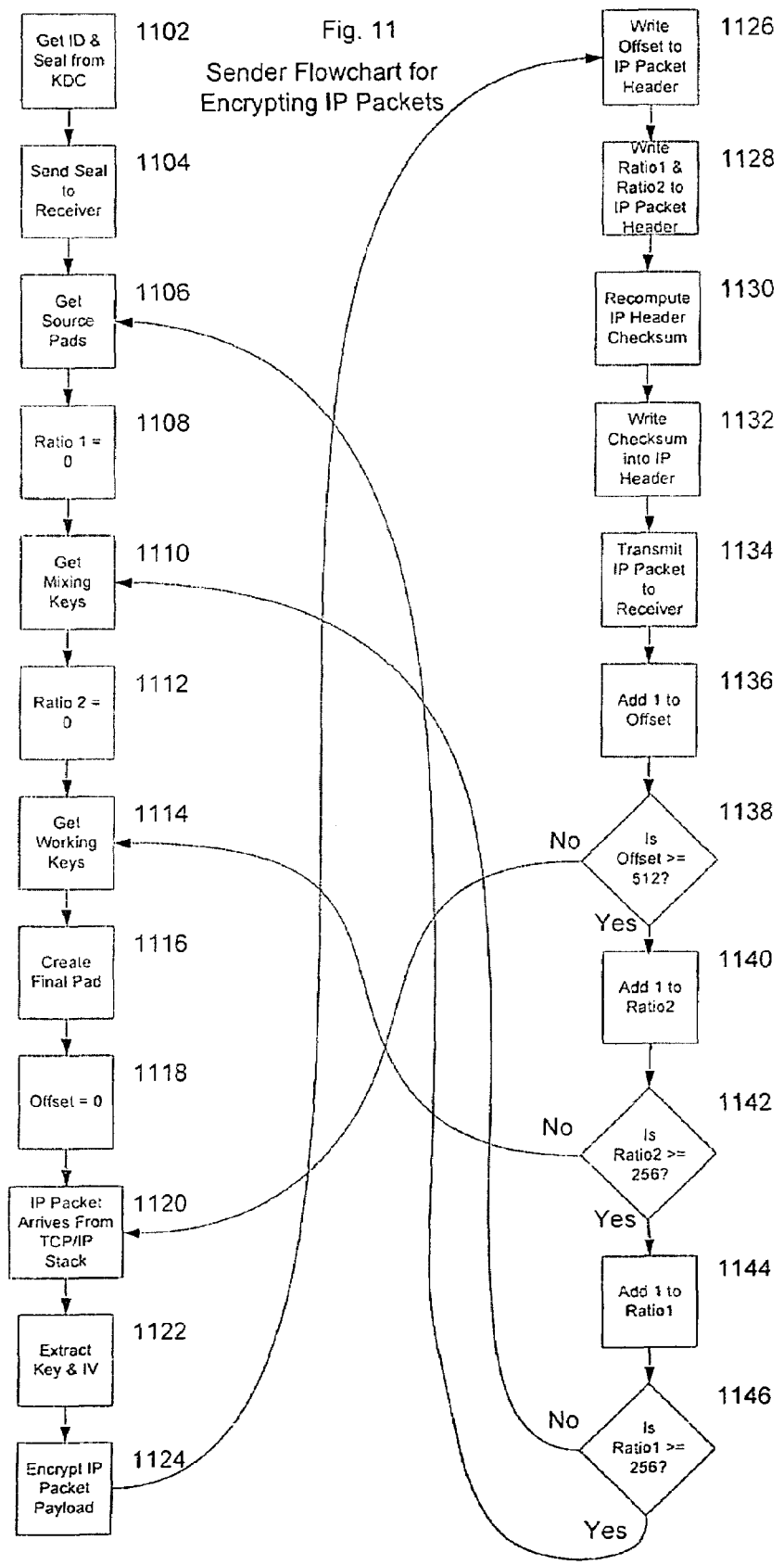
FIG. 11 depicts a flow diagram illustrating a process of encrypting the data payload of outgoing Internet Protocol packets.

Referring to FIG. 11, an exemplary process to encrypt and send IP packets is shown by the flow diagram. When the sender's application sends data to the receiver's application it causes an IP packet to be created by the sender's TCP/IP stack and readied for transmission. When this occurs the sender's KM Service requests key and pad materials from the KDC using a PAL request packet. In many embodiments, PAL protocol packets are secured using any number of well-known techniques. It can be a modified Kerberos protocol, with extensions to allow the receiver to communicate with the KDC. Or it can be like the TriStrata PAL protocol.

In block 1102, the KDC provides a session identifier both in the clear and encrypted with a key only the KDC knows inside a PAL response packet. In some embodiments, this session identifier will be used by the KDC to keep track what keys and pads have been issued for any given set of encrypted packets flowing between the sender and receiver computers. In some embodiments, the PAL response packets are utilized to transmit the keys securely to the sender computer and the receiver computer.

In block 1104, the sender's KM Service transmits the encrypted session identifier to the receiver's KM Service using a special KM packet over UDP or IP, this is also known as the session setup packet. In some embodiments, the encryption of the session identifier can be done in any known appropriate method for correctly securing a small piece of important data. For example, in one instance, the session identifier can be encrypted with the AES cipher using a CBC mode with 128-bit key. Additionally, a SHA-2 one-way hash with a 256-bit digest could be computed over the encrypted Session Identifier, encrypted and attached to it.

In block 1106, the sender's KM Service requests source pads from the KDC.

In block 1108, a local ration 1 counter is set to zero. In block 1110, the mixing keys are requested from the KDC. In block 1112, a local ration 2 counter is set to zero. In block 1114, the working keys and rotation values are requested from the KDC.

In block 1116, the encryption intermediate driver creates the 16 Kbyte Working Pad. In block 1118, the local offset value for selecting a AES Key and an IV from the final pad is set to zero. In block 1120, the IP packet with a clear data payload is delivered by the TCP/IP stack to the encryption intermediate driver.

In block 1122, using the offset value, the key and IV are extracted from the final pad. For example, in one instance, the encryption of an IP packet's data payload utilizes a 16 byte AES key and a 16 byte IV value, for a total of 32 bytes. There are 512 unique pairs of AES key and IV values that can be extracted from a 16 Kilobyte Final Pad. In some embodiments, each unique pair is associated with an offset value from 0 to 511. Each offset value must be at least 9 bits in size.

In block 1124, the encryption intermediate driver then encrypts the IP packet's data payload with the extracted AES key and IV values. For example, in one instance, the encryption of the payload could use the AES key and IV with a NIST approved AES counter mode (CTR) to operate as a stream cipher. This allows each byte of the IP packet's data payload to be encrypted without requiring any pad bytes to make it aligned with a block size of 16 bytes.

In block 1126, the offset value, 9 bits, is written into the unused fragmentation field of the IP packet. In block 1128, the ratio 1 and ratio 2 values, 8 bits each, are written into the fragmentation identification field. In one embodiment, the ratio 1 and ratio 2 values are replaced by adding an extra bit in the offset value to prevent the rollover of it from 511 to 0 without detection. In one instance, the offset value is larger, and consumes all the available bits in the standard IP fragment identifier and fragment offset fields.

In block 1130, after modifying the IP header fields, the header checksum is recomputed. In block 1132, the header checksum is written into the IP header again.

In block 1134, the encryption intermediate driver gives the IP packet with the modified header and encrypted data payload to the Layer-2 Driver. In block 1134, the IP packet with the modified header and encrypted data payload is given to the NIC that then transmits it to the receiver computer.

In block 1136, a value is added to the offset value. In block 1138, if the offset value is less than 512 then return to the block 1120. In block 1140, a value is added to the ratio 2 value. In block 1142, if the ratio 2 value is less than 512 then return to the block 1114. In block 1144, a value is added to the ratio 1 value. In block 1146, if the ratio 1 value is less than 512 then return to the block 1106.

Figure 12:
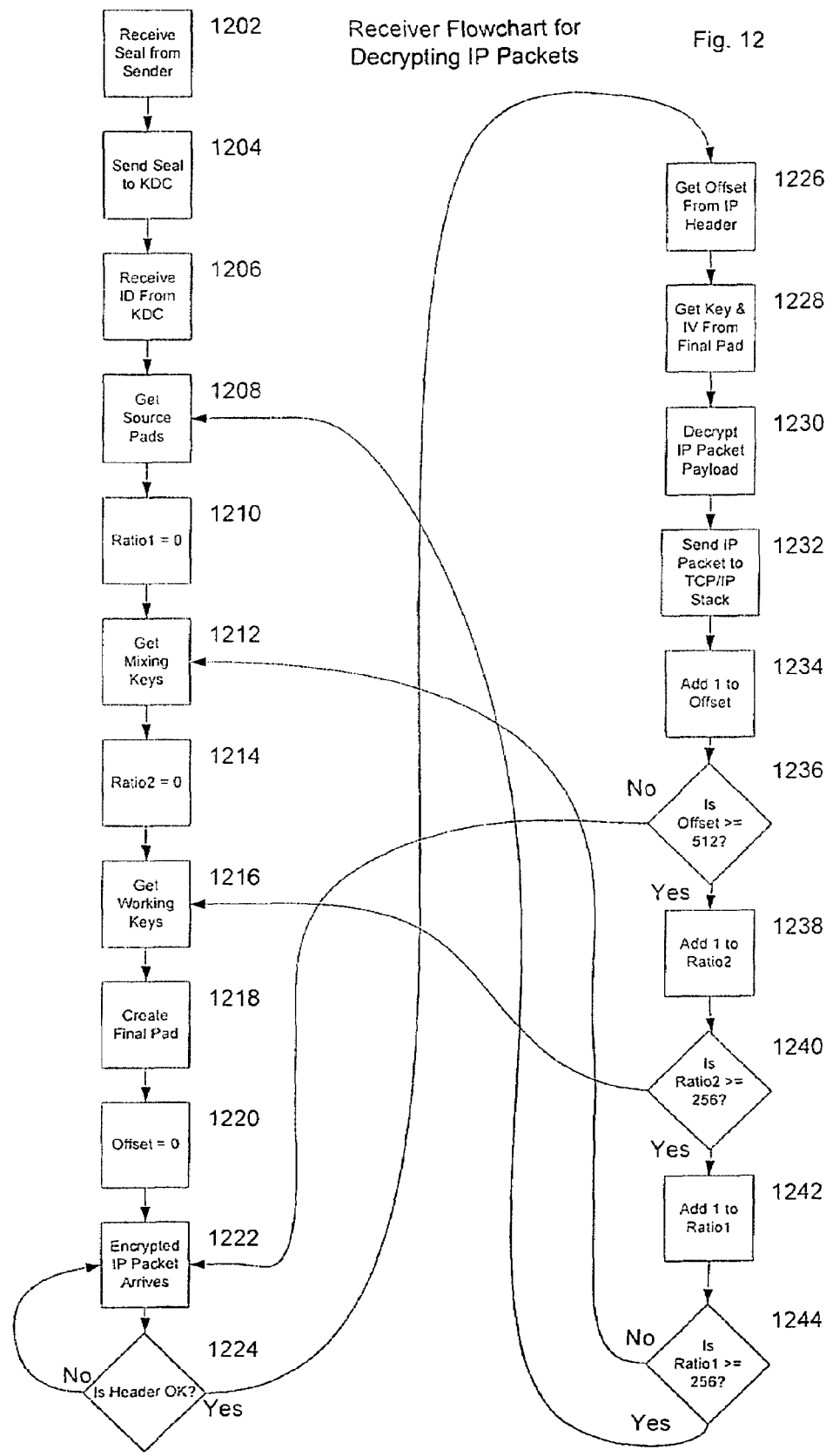
FIG. 12 depicts a flow diagram illustrating a process of decrypting the data payload of incoming Internet Protocol packets.

Referring to FIG. 12, an exemplary to receive and decrypt encrypted IP packets is shown by the flow diagram. In block 1202, the receiver KM Service receives an encrypted session identifier from the sender from a special KM packet over UDP or IP, the Setup Packet. In block 1204, the encrypted session identifier is sent to the KDC Server using a PAL request packet. In block 1206, the KDC decrypts the encrypted session identifier and responds with the session identifier inside a PAL response packet.

In block 1208, the receiver's KM Service requests and receives source pads from the KDC. In block 1210, a local ratio 1 counter is set to zero. In block 1212, the mixing keys are requested from the KDC. In block 1214, a local Ratio 2 counter is set to zero. In block 1216, the working keys and rotation values are requested from the KDC. In block 1218, either the KDC or the encryption intermediate driver creates the 16 Kbyte working pad. In block 1220, the local offset value for selecting a key value and an IV value from the final pad is set to zero.

In block 1222, an encrypted IP packet arrives from the Layer-2 driver and is sent to the encrypted intermediate driver. In block 1224, it is determined if the ratio 1 and ratio 2 in the IP packet header match the local ratio 1 and ratio 2. If there is not a match, the packet is dropped and return back to the block 1222. If there is a match, extract the 9 bit offset value from the IP packet's header in block 1226.

In block 1228, using the offset value, the key and IV are extracted from the final pad. In block 1230, the decryption intermediate driver then decrypts the IP packet's data payload with the extracted AES key and IV values. In block 1232, the IP packet with a clear data payload is delivered to the local TCP/IP Stack. In some embodiments, the ratio 1, ratio 2 and offset values can be optionally cleared from the IP packet header, and the header checksum can be recomputed prior to delivering the IP packet to the TCP/IP Stack.

In block 1234, a value is added to the offset value. In block 1236, if the offset value is less than 512, then return back to the block 1222. In block 1238, a value is added to the ratio 2 value. In block 1240, if the ratio 2 value is less than 512, then return back to the block 1240. In block 1242, a value is added to the ratio 1 value. In block 1244, if the ratio 2 value is less than 512, then return back to the block 1206.

In some embodiments, the use of the ratio 1 value and the ratio 2 value for a given packet indicates which source pad is utilized in encrypting the packet. In some instances, the ratio 1 value and the ratio 2 value also assist in determining the order of the packets once multiple packets arrive at the receiver computer. For example, the packets arrive out of order and the ratio values are utilized to determine the correct order of the packets.

In some embodiments, the offset value is utilized to indicate a location within the source pad that is identified by the ratio 1 value and the ratio 2 value. In some instances, the offset value is utilized to assist in determining the order of the packets once multiple packets arrive at the receiver computer. In this example, the offset value provides additional ordering assistance when the ratio 1 value and the ratio 2 value repeats.

Figure 13:
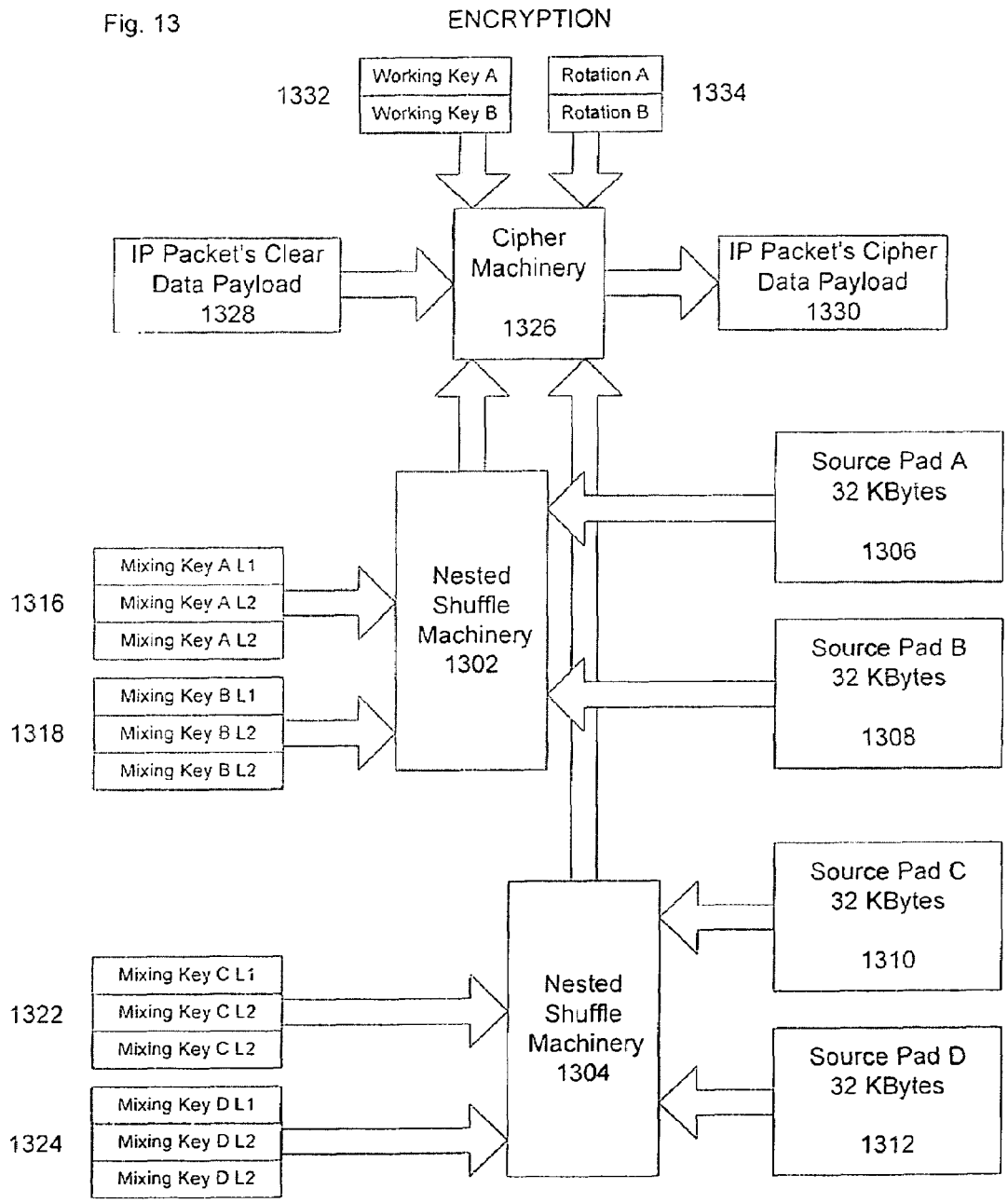
FIG. 13 depicts a diagram illustrating encryption of a series of Internet Protocol packets according to the invention.

Referring to FIG. 13, for encryption the cipher machinery (1326) takes as input two working pads, derived from the four source pads (1306, 1308, 1310, 1312), two working keys (1332), two rotation values (1334), and the 512 IP packets (1328). The two working pads each comes from one of the two nested shuffle machineries (1302, 1304). One machinery (1302) takes as input two source pads A and B (1306, 1308), and two sets of three mixing keys (1316, 1318). The other machinery (1304) takes as input two source pads C and D (1310, 1312), and two sets of three mixing keys (1322, 1324). The number of IP packets with clear text data (1328) cannot exceed 512 packets, before requiring a new set of Working Keys and rotation values. The number of IP packets with clear text data cannot exceed 131,072 packets, before requiring a new set of mixing keys. The number of IP packets with clear text data cannot exceed 33,554,432 packets, before requiring a new set of source pads. Every IP packet with clear text data is transformed out into a corresponding IP packet with cipher text data (1330).

Figure 14:
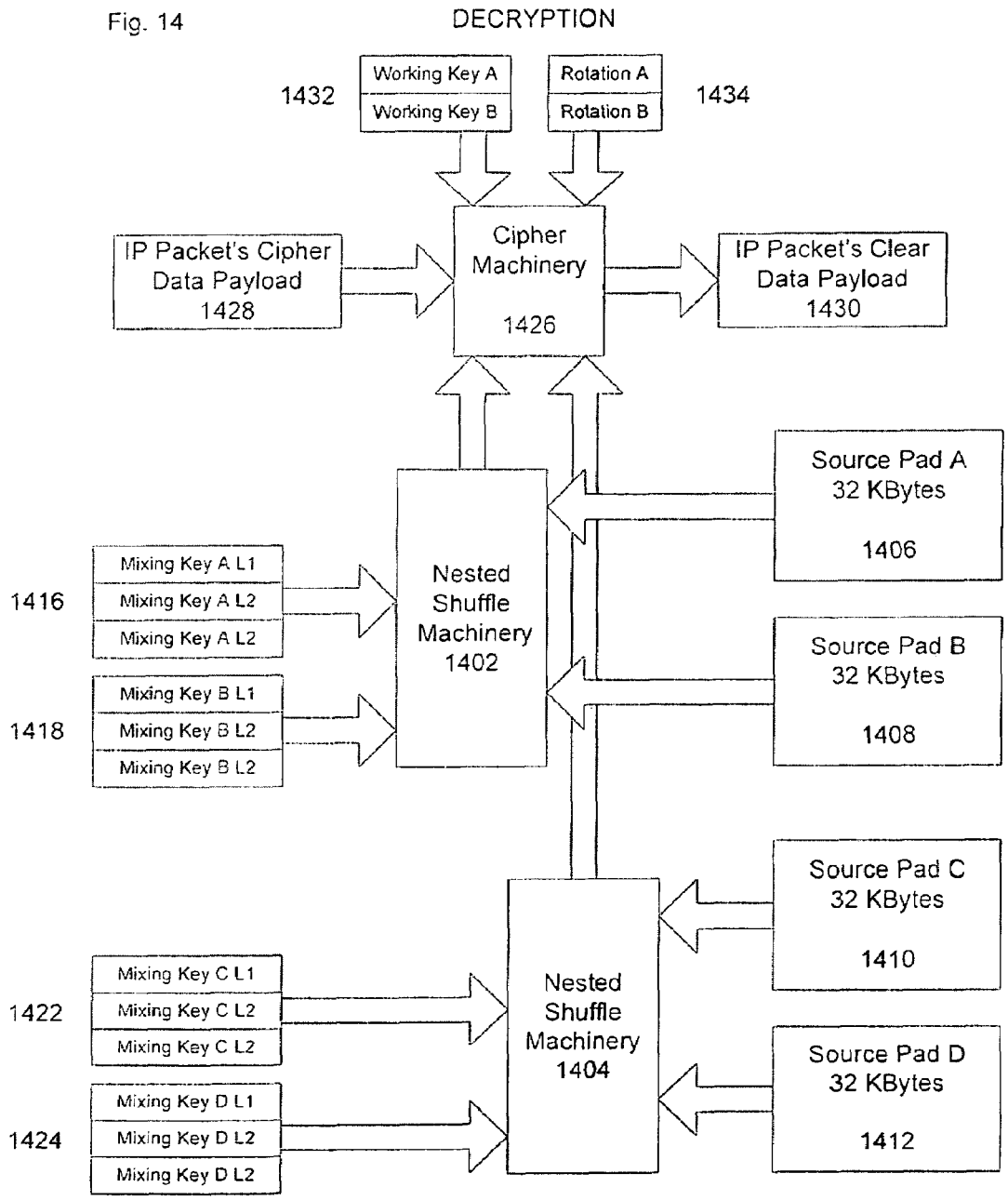
FIG. 14 depicts a diagram illustrating decryption of a series of Internet Protocol packets according to the invention.

Referring to FIG. 14, decryption is identical to encryption, except that now the cipher machinery (1426) takes as input two working pads, derived from the four source Pads (1406, 1408, 1410, 1412), two working keys (1432), two rotation values (1434), and the cipher text data (1428). The two working pads each comes from one of the two nested shuffle machineries (1402, 1404). One machinery (1402) takes as input two source pads A and B (1406, 1408), and two sets of three Mixing Keys (1416, 1418). The other machinery (1404) takes as input two source pads C and D (1410, 1412), two substitution keys C and D (1420), and two sets of three Mixing Keys (1422, 1424). The number of IP packets with cipher text data (1428) cannot exceed 512 packets, before requiring a new set of working keys and rotation Values. Note that within each group of 512 packets, packets can be lost or arrive out of order. Packets delayed by network latency that arrive after a new set of working keys and rotation values have been used, cannot be decrypted and must be thrown away. The number of IP packets with cipher text data cannot exceed 131,072 packets, before requiring a new set of mixing keys. The number of IP packets with cipher text data cannot exceed 33,554,432 packets, before requiring a new set of source pads. Every IP packet with cipher text data is transformed out into a corresponding IP packet with clear text data (1430).

Figure 15:
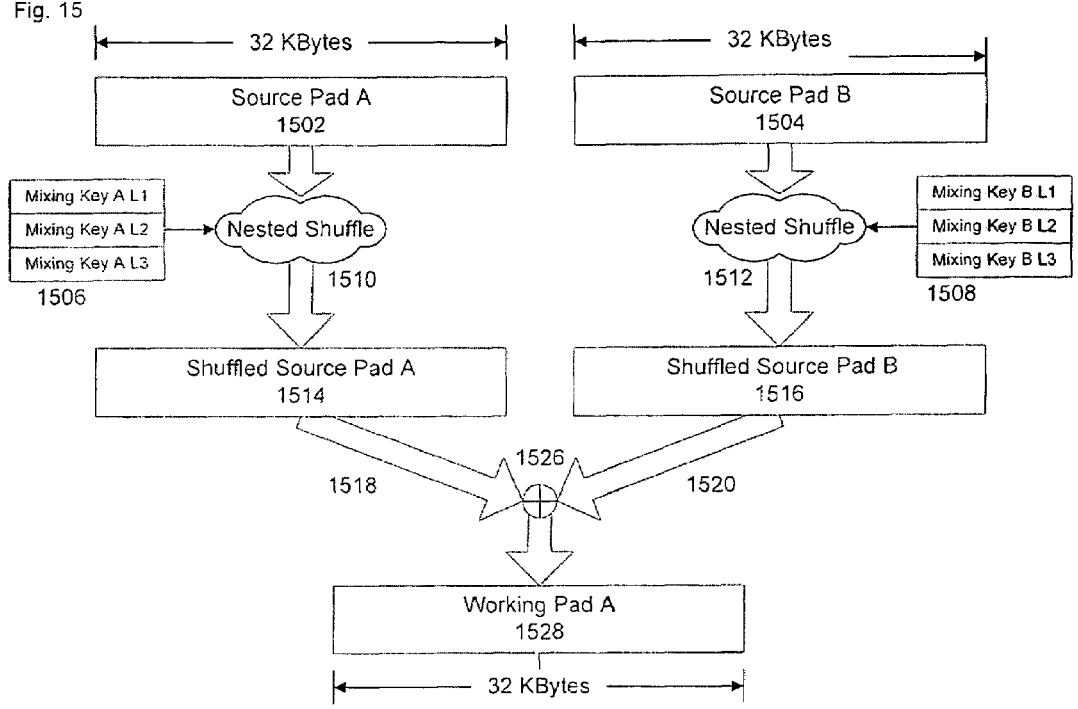
FIG. 15 depicts a flow diagram illustrating a half of the first part of the key generation according to the invention.

FIG. 15 reveals an internal view of a half of an initial phase of the cipher machinery. The source pad A of 32 kilobytes (1502) is nested shuffled (1510) with the three mixing keys A (1506) resulting in a shuffled source pad A of 32 kilobytes (1514). The source pad B of 32 kilobytes (1504) is nested shuffled (1512) with the three mixing keys B (1508) resulting in a shuffled source pad B of 32 kilobytes (1516). XOR the two resulting pads together (1526), byte-by-byte, and the result is a 32-kilobyte working pad A (1528).

Figure 16:
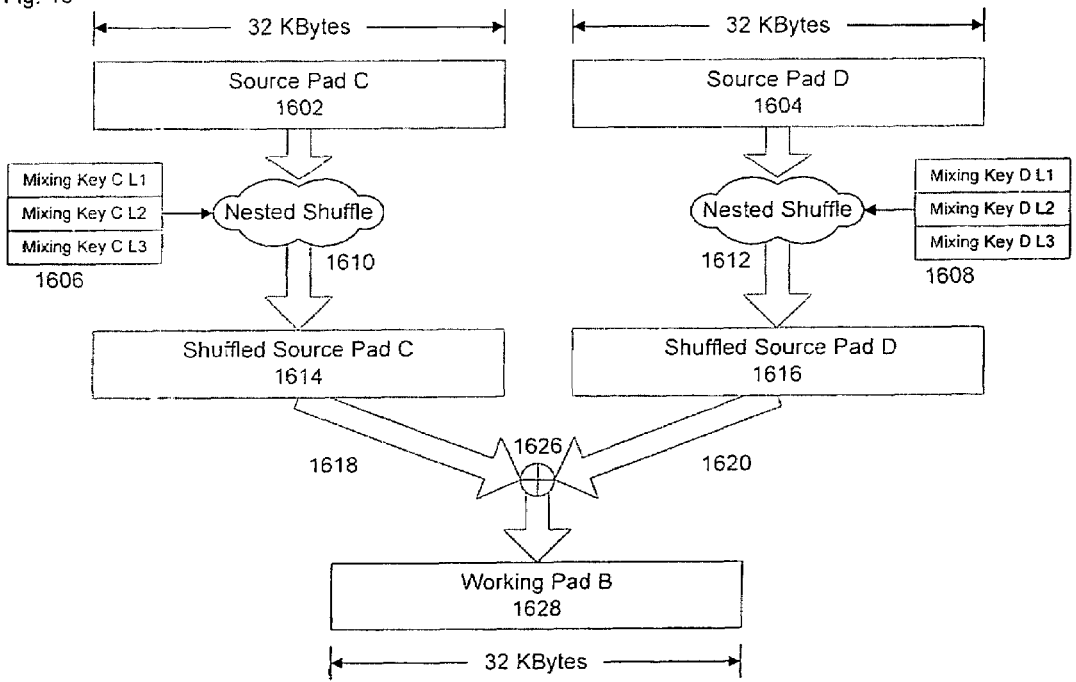
FIG. 16 depicts a flow diagram illustrating another half of the first part of the key generation according to the invention.

FIG. 16 reveals an internal view of another half of the initial phase of the cipher machinery. The source pad C of 32 kilobytes (1602) is nested shuffled (1610) with the three mixing keys C (1606) resulting in a Shuffled Source Pad C of 32 kilobytes (1614). The source pad D of 32 kilobytes (1604) is nested shuffled (1612) with the three mixing keys D (1608) resulting in a shuffled source pad D of 32 megabytes (1616). XOR the two resulting pads together (1626), byte-by-byte, and the result is a 32-kilobyte Working Pad B (1628).

Figure 17:
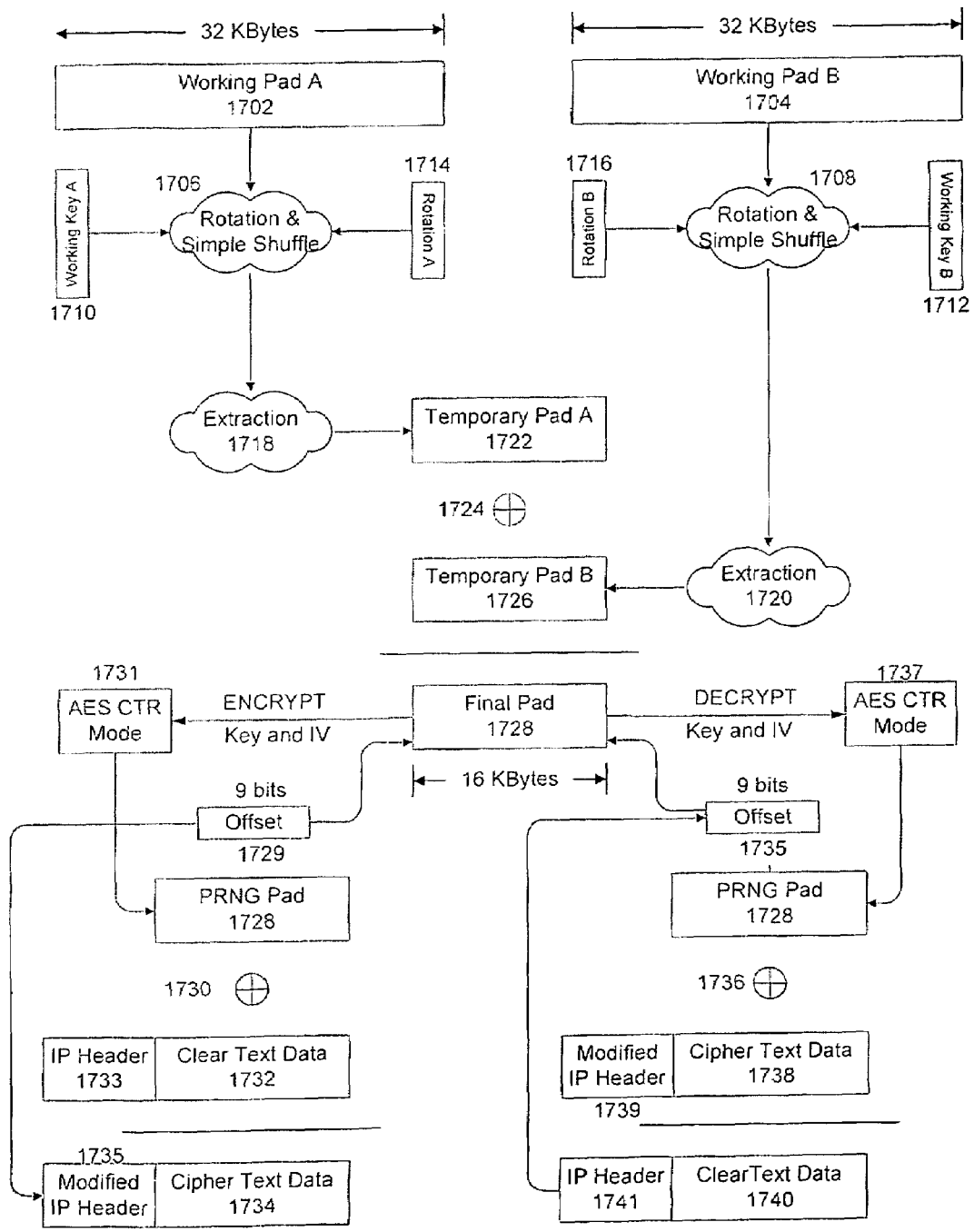
FIG. 17 depicts a flow diagram illustrating the second and final part of the key generation, and encryption or decryption of an Internet Packet data payload, according to the invention.

FIG. 17 reveals an internal view of a final phase of the cipher machinery. The working pad A (1702) is rotated and then simple shuffled (1706), using a working key A (1710) and a rotation value A (1714), then extract half of each of the cards (1718), and the result is a 16-kilobyte temporary pad A (1722). The working pad B (1704) is rotated and then simple shuffled (1708), using a working key B (1712) and a rotation value B (1716), then extract half of each of the cards (1720), and the result is a 16-kilobyte temporary pad B (1726). XOR the two resulting temporary pads (1722, 1726) together (1724), byte-by-byte, and the result is a 16 kilobyte final pad (1728). This final pad can then be used with a 9-bit offset value (1729), which is incremented by one for each IP packet, to extract a unique 16-byte AES key and a unique 16-byte IV from each 32-byte position within the final pad. Using the key and IV as inputs into an AES cipher in counter mode (1731) results in a PRNG stream of bytes to XOR (1730) with IP packet clear text data payload (1732), byte by byte, resulting in IP packet cipher text data payload (1734). Or it can be used with a 9-bit Offset Value (1735) extracted from IP packet header (2039) to extract the AES key and IV from a 32-byte position within the Final Pad. Using the key and IV as inputs into an AES cipher in Counter Mode (1737) results in a PRNG stream of bytes to XOR (1736) with IP packet cipher text data payload (1738), byte by byte, resulting in IP packet clear text data payload (1740).

Figure 18:
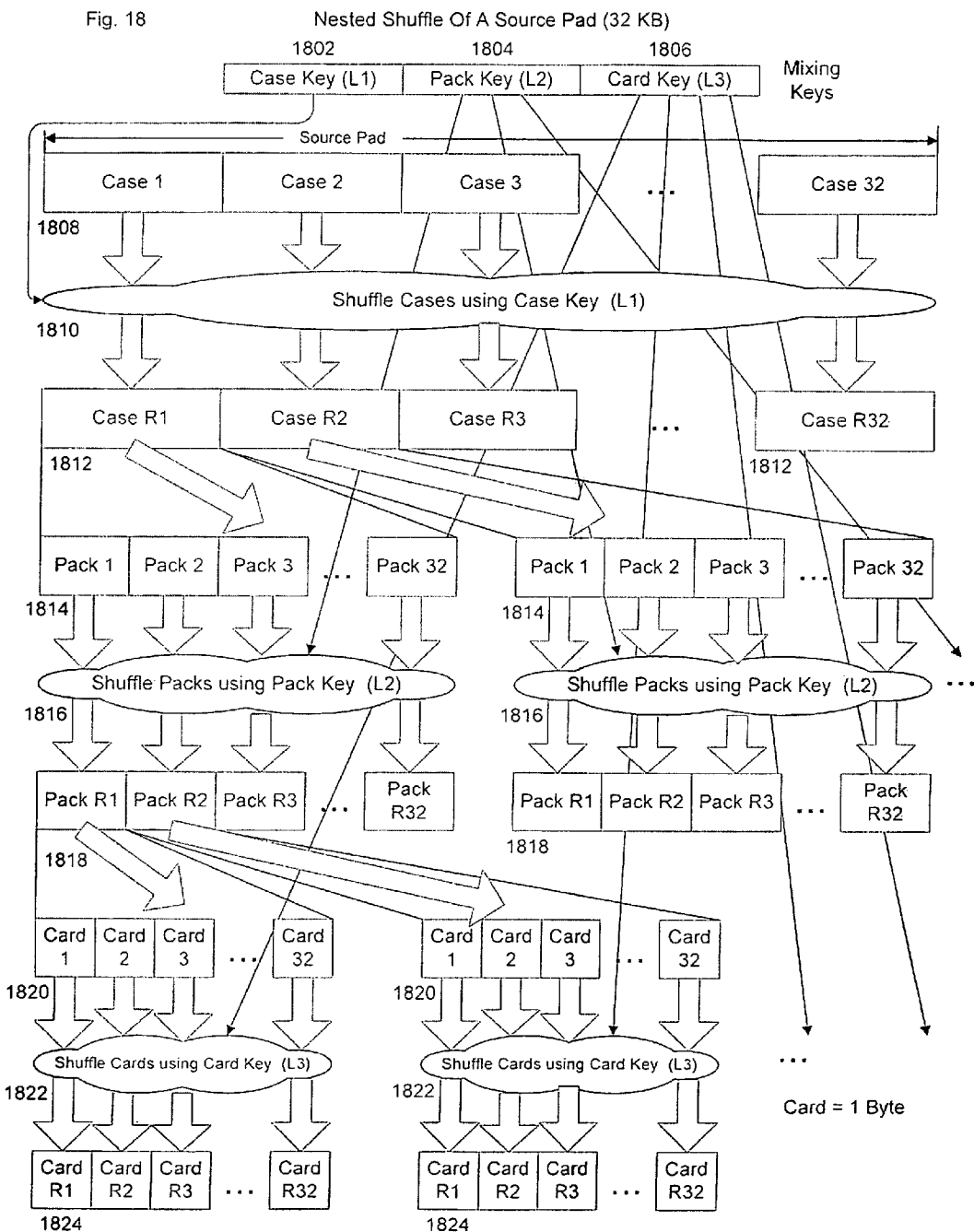
FIG. 18 depicts a flow diagram illustrating a nested shuffle of a source pad.

Referring to FIG. 18, the operation to nested shuffle a source pad A or B or C or D of 32 kilobytes each utilizes three mixing keys; a case key (1802), a pack key (1804) and a card key (1806), each having 32 unique 5-bit random numbers. The source pad is partitioned into 32 cases (1808). The cases (1808) are all shuffled together randomly (1810), using the case key (1802) to determine the shuffle pattern, and results in a random sequence of cases (1812). Each case is further partitioned into 32 Packs (1814). The packs (1814) within each case are shuffled together randomly (1816), using the pack key (1804) to determine the shuffle pattern, and results in a random sequence of packs (1818), identically shuffled per case. Each pack within each case is further partitioned into 32 cards (1820) of one byte each. The cards (1820) within each pack are shuffled together randomly (1822), using the card key (1806) to determine the shuffle pattern, and results in a random sequence of cards (1824), identically shuffled per pack. These three levels of shuffling, Level 1 (L1), Level 2 (L2) and Level 3 (L3), result in a randomly shuffled source pad, which has $(2^{32})^3$ or $2^{96}$ random permutations, i.e. entropy of 96 bits.

Figure 19:
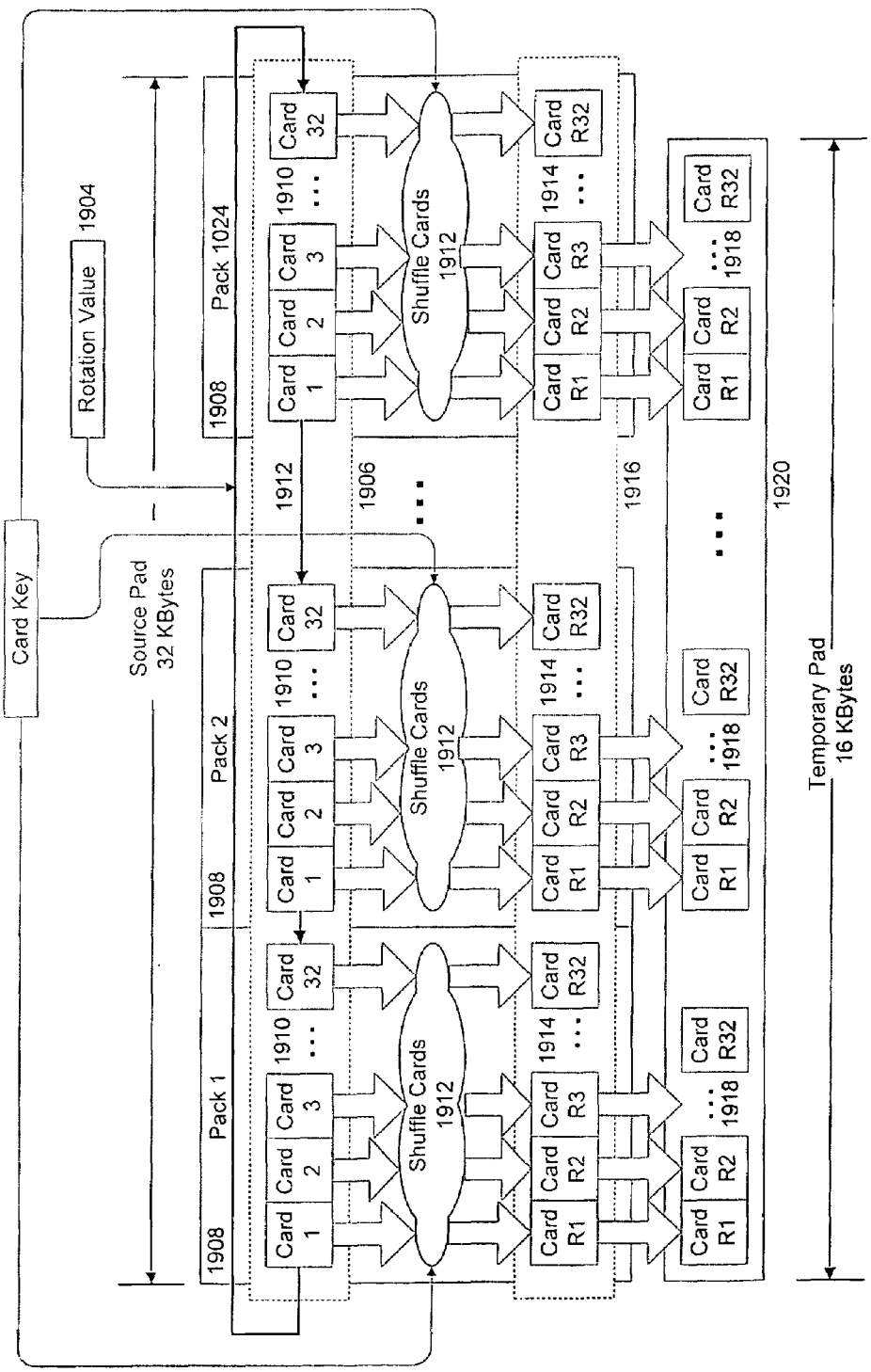
FIG. 19 depicts a flow diagram illustrating a rotation and simple shuffle of a working pad.

Referring to FIG. 19, this illustrates the core operation of generating the key and IV for each IP packet. First, a working pad of 32-kilobytes (1906) is randomly rotated by 4-byte intervals using the random rotation value (1904). Then, the working pad is sub-divided into 1024 packs (1908) of which each is further sub-divided into 32 cards (1910) where a card is 1 byte in size. Using the working key (1902), the cards are shuffled in the $1^{st}$ Pack (1912). This results in 32 randomly shuffled cards in the first pack (1914). This is repeated from $2^{nd}$ to the last pack in the working pad. This results in a 32 kilobyte rotated and shuffled working pad (1916). Finally we extract the first 16 cards of each pack (1918) and assemble them into an 16 kilobyte temporary pad (1920).

This shuffle can be done rapidly since a typical working key and many source pad packs can be brought in the microprocessor's fastest L1 cache. The working key stays in L1 cache, amortizing its load cost from DRAM over all the 1024 packs. Further, performance gains can be made by taking advantage of multiple ALU pipelines in a CPU to process either larger cards or multiple packs simultaneously. The source pads are considered to be secret, known only to the sender, the receiver, and the KDC server. The three levels of four sets of Mixing Keys, along with the four Source Pads, which themselves are periodically changed, interact to effectively keep the four Source Pads secret for as long as possible. This allows fast local generation of 33,554,432 keys and IV pairs per set of four source pads.

Figure 20:
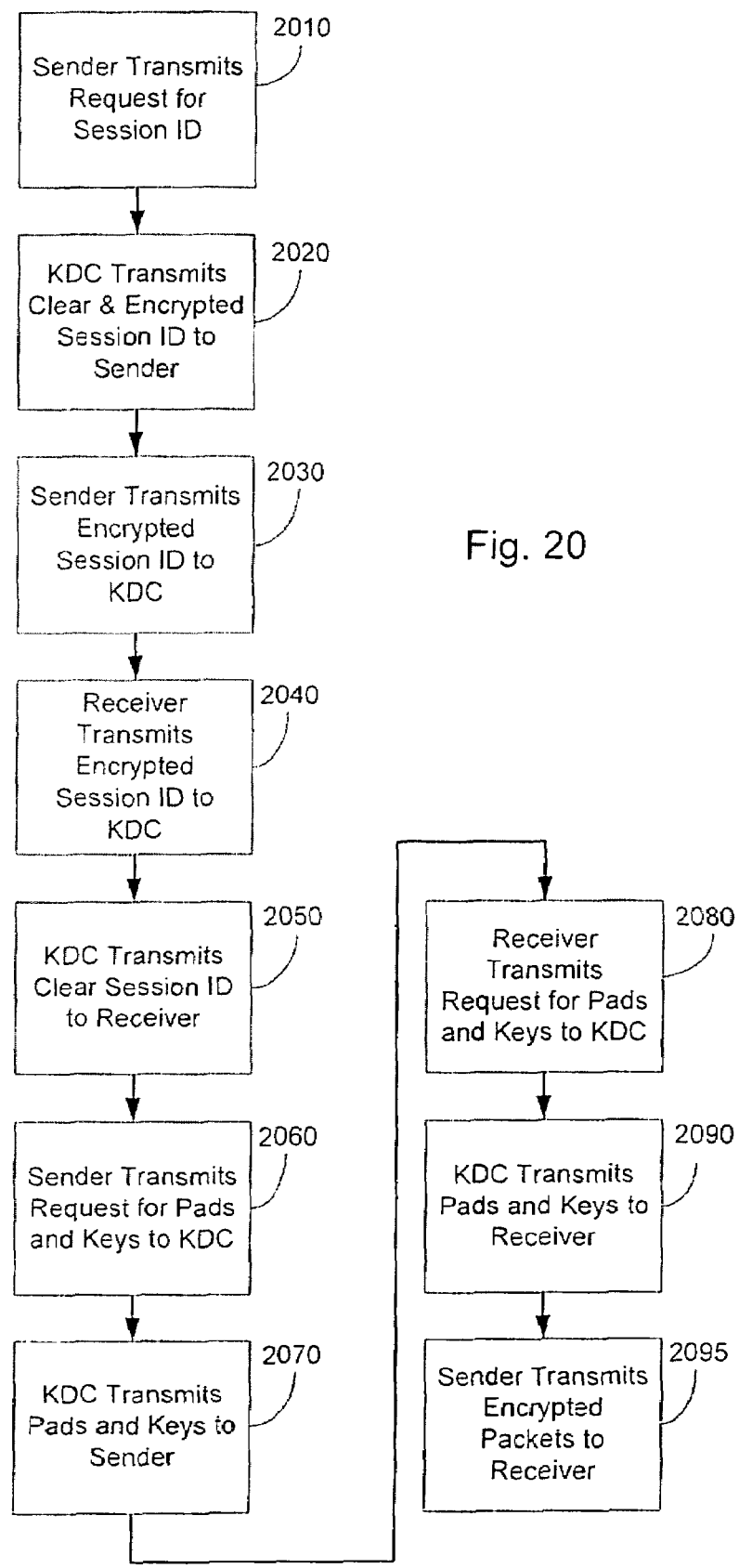
FIG. 20 depicts a flow diagram illustrating a process of setting up the sender computer and the receiver computer.

FIG. 20 illustrates a process for setting up the sender computer and the receiver computer for transmitting encrypted data packets. In block 2010, the sender computer transmits a request to the KDC for a session identifier. In block 2020, a clear and encrypted session identifier is sent from the KDC to the sender computer. In some embodiments, the KDC securely sends this session identifier to the sender computer via the PAL.

In block 2030, the sender computer sends the encrypted session identifier to the receiver computer via an unsecured network such as the Internet. In block 2040, the receiver computer transmits the encrypted session identifier to the KDC. In block 2050, the KDC transmits a clear session identifier to the receiver computer. In Block 2060, the sender computer transmits the session identifier and a request for pads and keys to the KDC. In block 2070, the KDC transmits the pads and keys to the sender computer. In Block 2080, the receiver computer transmits the session identifier and a request for pads and keys to the KDC. In block 2090, the KDC transmits the pads and keys to the receiver computer. In block 2095, the sender computer encrypts data within a packet according to the session identifier and sends the encrypted packet to the receiver computer over the unsecure network.

In some embodiments, the session identifier allows the sender computer to correctly encrypt the data packet and allows the receiver computer to correctly decrypt the data packet. In other embodiments, the session identifier also provides a convenient avenue to update policy restrictions and provide instructions to the sender computer and the receiver computer.

In some embodiments, the keys and IV are distributed to the sender computer and the receiver computer from the VDC through the PAL. In some instances, the keys and IV are periodically sent to the sender computer and the receiver computer. In other instances, the keys and IV are sent to the sender computer and the receiver computer on an as needed basis. In yet other instances, the keys and IV are sent to the sender computer and the receiver computer along with the session identifier.

The systems and methods for providing autonomous security deliver a secure and efficient mechanism for transmitting encrypted IP packets between sender and receiver computers. The systems and methods for providing autonomous security function within the size constraints of an unencrypted IP packet and neither introduce extra bytes into the encrypted IP packet nor increase the overall size of the encrypted IP packet by utilizing the slightly modified header (1002). In addition, the systems and methods for providing autonomous security encrypt and decrypt in such a manner as to minimize the burden on the host computer and to take full advantage the performance capabilities of modern microprocessor architectures.

The foregoing descriptions of specific embodiments of the invention have been presented for purposes of illustration and description. They are not intended to be exhaustive or to limit the invention to the precise embodiments disclosed, and naturally many modifications and variations are possible in light of the above teaching. For example, even though specific embodiments utilize the lpv4 standard, any routing protocol can be utilized with the invention.

The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

The invention claimed is:

1. A method comprising:
   modifying an original header associated with an original data packet wherein key information is added, wherein the modifying an original header further includes identifying at least one field in the original header for transporting packet assembly information and replacing the packet assembly information in the field with at least a portion of the key information;
   encrypting original data associated with the original data packet in response to the key information; and
   forming an encrypted data packet including a modified header and encrypted data, wherein the modified header is a same size as the original header.

2. The method according to claim 1 further comprising receiving a unique key identifier associated with the encrypted data packet.

3. The method according to claim 2 wherein the modifying further comprises modifying the original header in response to the unique key identifier.

4. The method according to claim 1 wherein the modifying further comprises replacing a fragmentation identification and a fragment offset of the original header with a mixing key and an offset.

5. The method according to claim 1 wherein the original data packet and the encrypted data packet utilize Internet Protocol version 4.

6. A system comprising:
   means for modifying an original header associated with an original data packet wherein key information is added, wherein the means for modifying an original header further includes the means for identifying at least one field in the original header for transporting packet assembly information and replacing the packet assembly information in the field with at least a portion of the key information;
   means for encrypting original data associated with the original data packet in response to the key information; and
   means for forming an encrypted data packet including a modified header and encrypted data, wherein the modified header is a same size as the original header.

7. A network encryption method, comprising:
   receiving a packet having a packet header and a packet payload;
   identifying a first field of the packet header for carrying packet assembly information;
   replacing the packet assembly information in the first field with a first encryption value and a second encryption value;
   encrypting original data associated with the packet payload in response to the first encryption value and the second encryption value; and
   forming an encrypted data packet including a modified header and encrypted data, wherein the modified header has a same size as the packet header.

8. The method according to claim 7, further comprising:
   identifying a second field of the packet header for carrying packet assembly information; and
   replacing the packet assembly information in the second field with a third encryption value.

9. The method according to claim 8, wherein the identifying a first field of the packet header for carrying packet assembly information includes identifying a fragment identification in the packet header.

10. The method according to claim 9, wherein the identifying a second field of the packet header for carrying packet assembly information includes identifying a fragment offset in the packet header.

11. The method according to claim 10, wherein the replacing packet assembly information in the first field with a first encryption value and a second encryption value further includes writing a mixing key refreshing ratio value and a working key refresh ratio in the first field.

12. The method according to claim 11, wherein the replacing packet assembly information in the second field with a third encryption value further includes waiting an offset of selecting key value in the second field.

13. The method according to claim 8, further includes activating checksum in accordance with a checksum field in the packet header after the packet assembly information in the first and the second fields is replaced with the first, second, and third encryption values.

14. The method according to claim 7, further comprising receiving a unique key identifier associated with the encrypted data packet.

15. The method according to claim 7, wherein the packet and the encrypted data packet utilize Internet Protocol version 4.

* * * * *